United States Patent Office 3,498,518
Patented Mar. 3, 1970

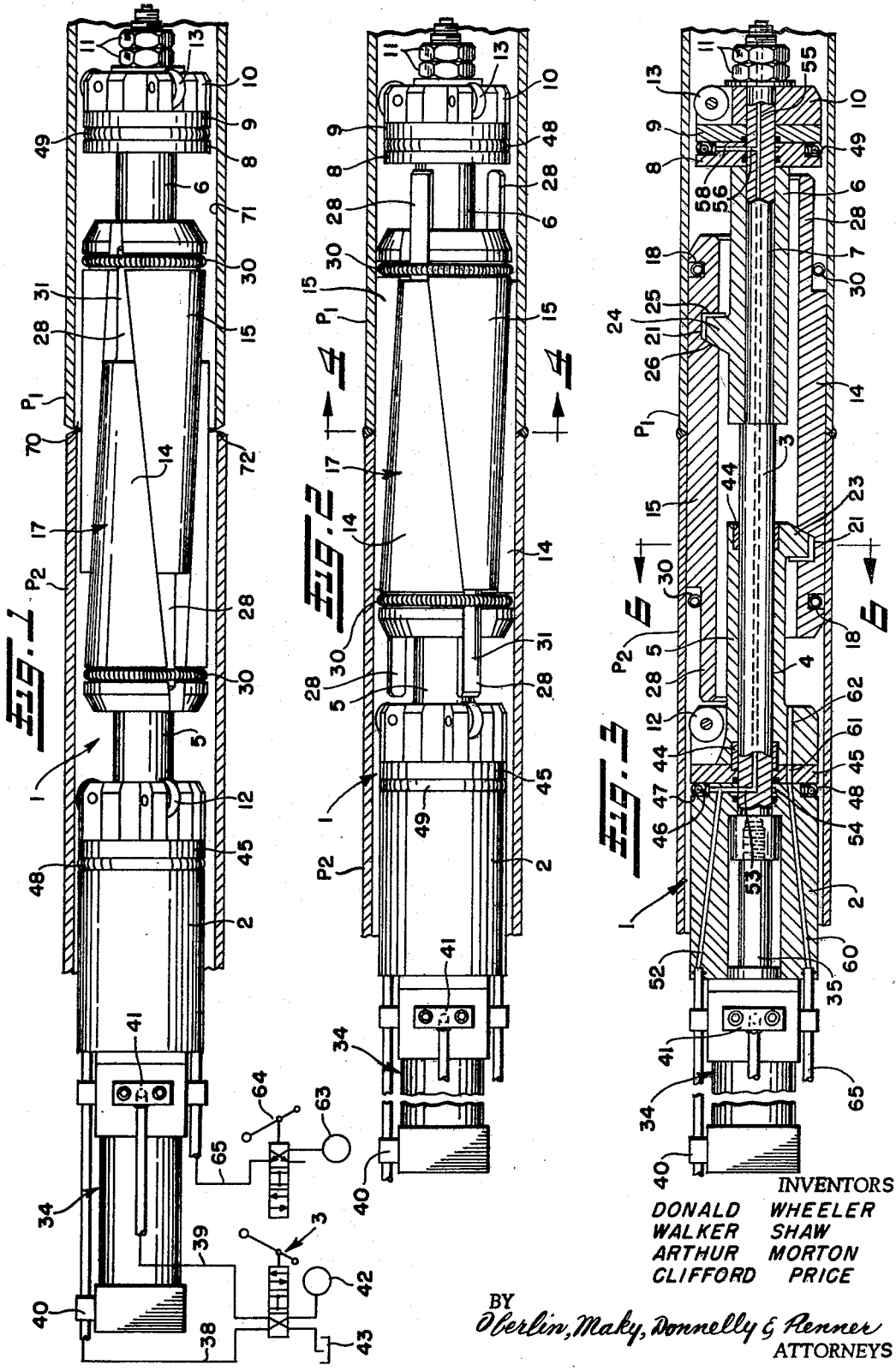

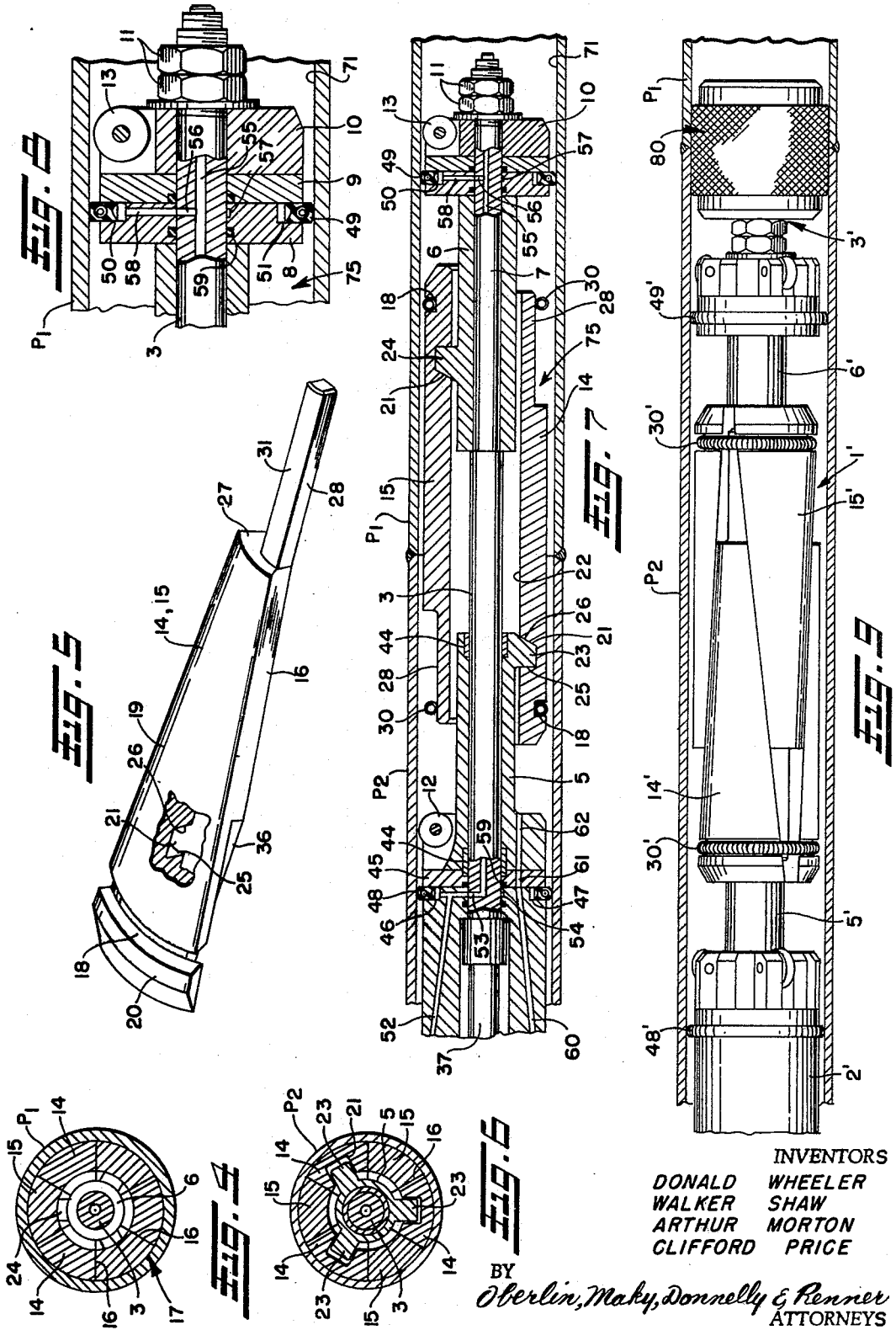

3,498,518
COMBINATION PIPE WELDING AND TESTING MANDREL

Donald Wheeler, Kent, Ohio, and Walker Shaw, Arthur Morton, and Clifford Price, Houston, Tex., assignors to The Guild Metal Joining Equipment Company, Bedford, Ohio, a corporation of Ohio
Filed July 27, 1967, Ser. No. 656,539
Int. Cl. B23k 31/02, 37/04; G01m 3/28
U.S. Cl. 228—50                                14 Claims

ABSTRACT OF THE DISCLOSURE

A portable pipe welding and testing mandrel having a plurality of axially and radially movable segments which form a continuous backup ring of various diameters in accordance with the I.D. of the pipes to be welded together. Expandable seals at opposite ends of the segments may be urged into fluid-tight enagement with the I.D. of the pipes to provide an internal test chamber for the weld.

Background of the invention

This invention relates to a novel combination pipe welding and testing mandrel which is adapted to be inserted in the ends of the pipes to be welded for maintaining such pipe ends in proper alignment while providing a continuous backup ring during welding, and includes novel means for subsequently testing the weld.

For continuous laying of pipe lines and the like, it is common practice to align each new section of pipe with the open end of the pipe sections already joined using a multi-segment external clamp and tack weld the pipe ends together between the segments. Afterwards, the clamp is removed to permit one or more continuous weld beads to be laid around the pipe joint to complete the assembly, all of which takes considerable time. Moreover, because of the spacing required between the clamp segments to permit tack welding around the pipe joint, the clamping pressure is not uniformly applied around the entire periphery of the pipes and may cause uneven deformation of the pipe ends. Even where there is no deformation, such external clamps align only the O.D. surfaces of the pipe ends and accordingly, any tolerence variations in the wall thickness of the pipes will be forced to the inside diameter which may affect the flow characteristics of the pipes.

Another disadvantage in using an external pipe clamp is that the weld cannot be laid in a single pass because of the interference provided by the clamp, and leaks may be caused by welding over the tack welds. Furthermore, an external clamp cannot provide a backup for the weld metal whereby "icicles" may form during welding which will further reduce the effectiveness of the pipe line.

Internal mandrels have been devised for engaging inside pipe diameters during welding which do not interfere with the welding operation, but in general such internal mandrels are relatively complex and expensive to manufacture and oftentimes do not eliminate icicle formation or provide a smooth I.D. between the pipe ends any better than the less expensive external clamps.

When the weld between pipe ends has been completed, it is necessary to test the joint for possible leaks. This may be accomplished by testing the quality of the weld as by using X-ray, ultrasonic, hydrostatic, aerostatic, or other non-destructive test means, or by pressurizing a completed portion of the pipe line which may comprise anywhere from 40 to 1,000 sections of pipe and a like number of welds and observing each weld for leaks. Regardless of which test procedure is followed, it has heretofore been a very expensive and time consuming operation.

Summary of the invention

With the apparatus of the present invention, the various problems enumerated above are substantially eliminated by providing a portable pipe welding mandrel which may be inserted in the ends of the pipes to be joined and expanded until the I.D. of the pipes are in proper alignment. The unique construction of the mandrel segments permits them to be expanded into a continuous ring of the required diameter to provide a continuous backup for the joint which precludes the formation of icicles and the like during welding.

The mandrel also includes a pair of expandable seals at opposite ends of the ring segments which may be urged into fluid-tight sealing engagement with the I.D. of the pipes to provide an internal chamber that may be filled with fluid to test the weld for leaks immediately after welding.

It is accordingly a principel object of this invention to provide a combination pipe welding and testing mandrel for properly aligning the I.D. of the pipes to be joined prior to welding and subsequently establishing a test chamber in the pipes in the area of the weld to permit testing of the weld, thereby eliminating the need for a separate pipe clamp and testing apparatus.

Another object is to provide such a mandrel for expanding the I.D. of the pipe ends to the extent necessary to provide a smooth I.D. wall.

A further object is to provide such a mandrel with a plurality of ring segments which may be axialy and radially moved to form a continuous backup ring of various diameters to correspond with the I.D. of the pipe ends to be welded.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention these being indicative, however, of but a few of the various ways in which the principles of the invention may be employed.

Brief description of the drawings

In the annexed drawings:

FIG. 1 is a side elevation view of a preferred form of pipe welding and testing mandrel constructed in accordance with this invention shown inserted in the ends of pair of pipes which are to be aligned by expansion of the mandrel segments prior to welding of the pipe ends together;

FIG. 2 is a side elevation view similar to FIG. 1 but with the mandrel segments shown expanded and the pipe ends held in alignment thereby during welding of the pipe ends together;

FIG. 3 is a longitudinal section through the mandrel of FIG. 2 taken on the plane of the line 3—3.

FIG. 4 is a transverse vertical section through the mandrel and welded joint of FIG. 2 to illustrate the continuous nature of the ring segments which provide a continuous backup for the weld;

FIG. 5 is a perspective view of one of the mandrel segments, the other segments being identical;

FIG. 6 is a transverse vertical section taken on the plane of the line 6—6 of FIG. 2 to show the connection between the ring segments and cam bars;

FIG. 7 is a longitudinal section similar to FIG. 3 but with the segments in the retracted condition and the seals at the opposite ends of the segments expanded into sealing engagement with the I.D. of the pipes on opposite sides of the weld;

FIG. 8 is an enlarged fragmentary section of the right end of the mandrel of FIG. 7; and FIG. 9 is a side elevation view of another form of pipe welding and testing mandrel in accordance with this invention.

Description of the preferred embodiments

Referring now in detail to the drawings and first especially to FIGS. 1-3, there is shown by way of example a pipe welding and testing mandrel 1 which may comprise a main body member 2 having a reciprocable pull bar assembly 3 extending axially outwardly through a central opening 4 in a stationary cam bar 5 bolted or otherwise secured to the main body member 2. A traveling cam bar 6 is mounted on the outer reduced end portion 7 of the pull bar assembly 3 for reciprocating movement therewith.

Also mounted on the reduced end portion 7 outwardly of the traveling cam bar 6 are a traveling block seal carrier 8 and seal container 9, and a wheel support bracket 10, all of these parts being retained in place by a pair of jam nuts 11 threadedly engaging the reduced end portion. Support wheels 12 and 13 on the stationary cam bar 5 and wheel support bracket 10 provide rolling contact with the I.D. of a pipe when the mandrel is collapsed in a manner to be subsequently fully described.

Intermediate the main body member 2 and carrier 8 are a plurality of circumferentially spaced arcuate ring segments 14, 15 of generally triangular configuration. The segments 14, 15 are identical except that the alternate segments 14 and intermediate segments 15 extend in opposite directions for mating engagement of their radial sides 16 to provide a continuous annular ring 17. One of the identical segments 14, 15 is shown in FIG. 5 as having a circumferentially extending groove 18 in the outer arcuate surface 19 adjacent the base 20. A recess or pocket 21 is provided in the inner surface 22 of the segments 14, 15 inwardly of the groove 18 for receipt of one or the other of the cams 23, 24 on the stationary and traveling cam bars 5 and 6, respectively. The outer wall 25 of the recess 21 is perpendicular to the inner surface 22 whereas the inner wall 26 is tapered for wedging of the similarly shaped cams 23, 24 in a direction away from the recess. Projecting axially from the narrow end 27 of the segments 14, 15 radially inwardly of the O.D. surface 19 a distance approximately equal to the depth of the groove 18 is an elongated narrow finger element 28.

As apparent from FIG. 6, the cams 23 on the stationary cam bar 5 are equal in number and spacing to the alternate segments 14 for receipt of the cams 23 in the associated recesses 21, and there are an equal number of cams 24 on the traveling cam bar 6 for receipt in the recesses 21 in the intermediate segments 15 which face in the opposite direction. Although the number of segments 14, 15 may obviously be varied as desired depending for example upon the diameter of pipe with which the mandrel 1 is to be used, six segments are shown. Annular springs 30 disposed in the segment grooves 18 in overlying relation with the outer surface 31 of the adjacent finger elements 28 hold the segments 14, 15 together while permitting expansion and contraction of the segments in a manner to be subsequently explained.

In FIG. 1, the segments 14, 15 are shown fully retracted to provide a ring 17 which is continuous but of a diameter somewhat less than the diameter defined by the outer periphery of the support wheels 12, 13, whereby the mandrel 1 may be rolled along the I.D. of a pipe without interference. Expansion of the segments 14, 15 occurs when the pull bar assembly 3 and intermediate segments 15 carried thereby are moved axially inwardly toward the main body member 2 as by actuation of a piston-cylinder assembly 34 having its rod 35 coupled to the pull bar assembly 3. The alternate segments 14 are held against axial movement by the stationary cam bar 5 and accordingly as the intermediate segments 15 are moved between the alternate segments, all of the segments are wedged radially outwardly against the bias of the retainer springs 30. The segments 14, 15 always define a continuous ring 17 despite the increase in diameter of the ring because of the wedging action between the sides 16 of the segments which causes the radial expansion. Recesses 36 in the inner surface 22 of the segments 14, 15 adjacent the sides 16 receive the finger elements 28 during such relative axial movement of the intermediate segments 15 between the alternate segments 14. Fluid pressure may be selectively supplied to opposite ends of the piston-cylinder assembly 34 for reciprocating the pull bar assembly 3 by a conventional valve mechanism 37 (see FIG. 1) which through suitable flow lines 38, 39 selectively communicates the cylinder ports 40, 41 with a pressure source 42 and tank 43. Sleeve bushings 44 in the central opening 4 of the stationary cam bar 5 facilitate reciprocating movement of the pull bar assembly 3 therein.

Interposed between the main body member 2 and stationary cam bar 5 is a seal retainer plate 45 which defines with an annular shoulder 46 on the adjacent end of the main body member 2 an annular groove 47 for receipt of an expandable ring-type seal 48. A similar seal 49 is positioned in a groove 50 defined by an annular shoulder 51 on the carrier block 8 and retainer plate 9 at the outer end of the pull bar assembly 3. The seal 48 is expanded by fluid pressure which is supplied to the bottom of the groove 47 through a passage 52 in the main body member 2 in communication with the flow line 38 and cylinder port 40 at the blind end of the piston-cylinder assembly 34.

The flow line 38 and passage 52 may also be communicated with the bottom of the groove 50 for expanding the other seal 49, but preferably only when the pull bar assembly 3 is fully extended as shown in FIG. 7 and the segments 14, 15 are fully retracted. This may be accomplished by providing a radial passage 53 in the inner end of the pull bar assembly 3 which communicates with the passage 52 via an annular groove 54 when the pull bar assembly 3 is fully extended. The radial passage 53 communicates with the groove 50 through axial and radial passages 55, 56 in the pull bar assembly 3 and groove 57 and radial passage 58 in the carrier block 8. O-ring seals 59 may be disposed around the pull bar assembly 3 on opposite sides of the grooves 54, 57 in the main body member 2 and carrier block 8 to preclude fluid leakage. Aligned passages 60, 61, and 62 in the main body member 2, retainer plate 45, and stationary cam bar 5 may be connected to a suitable pressure source 63 through a control valve 64 and flow line 65 for supplying fluid to the interior of a pipe intermediate the seals 48, 49 for a purpose to be subsequently explained.

The structure of the mandrel 1 of the present invention having thus been set forth, its operation will now be described in detail.

Operation

In using the mandrel 1 when laying a pipe line or the like, the reduced outer end portion 7 of the pull bar assembly 3 is first inserted into the open end 70 of the last pipe section $P_1$ in the line with the segments 14, 15 fully retracted for ease of insertion of the mandrel therein and rolling of the mandrel along the I.D. surface 71 of the pipe section $P_1$ until the segments 14, 15 extend approximately half way into the pipe section $P_1$ as shown in FIG. 1. Next the flow lines 38, 39 and 65 are passed through the new pipe section $P_2$ to be joined to the pipe line and such flow lines are suitably connected to the mandrel, after which the new pipe section $P_2$ is telescoped over the exposed portion of the mandrel 1 to bring its end 72 closely adjacent the end 70 of the pipe section P₁.

Now the segments 14, 15 are expanded to a diameter approximately equal to the I.D. of the pipe sections P₁, P₂ by supplying fluid pressure to the cylinder port 41 and connecting the cylinder port 40 to tank 43, which causes the pull bar assembly 3 and intermediate segments 15 carried thereby to be moved axially inwardly forcing all of the segments radially outwardly. As the segments 14, 15 are expanded, they move outwardly as a continuous ring 17 which applies pressure uniformly to the I.D. of the pipe sections to bring the pipe sections into proper alignment, and should the pipe sections be out of round or due to tolerance variations be of unequal inner diameters, the segments may be expanded sufficiently to round out the pipe ends and expand any tolerance differentials to the O.D. of the pipe sections, thereby creating a smooth I.D. surface which provides ideal weld conditions and eliminates flow inefficiencies which would occur if the I.D.'s were not smooth. Moreover, since the ring segments 14, 15 engage the I.D. of the pipes the mandrel 1 may be left in place during the entire welding operation permitting continuous laying of the weld bead without interruption in one or more passes.

The expanded segments 14, 15 also provide a continuous backup ring 17 for the weld which eliminates "icicle" formation and the like that might affect the flow characteristics of the pipe line and cause damage to or prevent passage of a "pig" through the pipe during testing and cleaning. The ring segments 14, 15 may be made of copper or like metal to provide a heat sink for transferring the heat away from the weld, whereby even plastic coated pipe sections may be welded without destroying the plastic lining which may extend to within an inch of the pipe ends. An inert atmosphere may be supplied to the interior of the pipe line through the aligned passages 60, 61, and 62 in the mandrel 1 during welding of the pipe ends together by stick electrode, megarc, or other welding techniques.

Upon completion of the weld, the ring segments 14, 15 are collapsed by supplying fluid pressure to the blind end of the piston-cylinder assembly 34 through the cylinder port 40 which causes the outer end of the pull bar assembly 3 and thus the intermediate segments 15 to move axially away from the main body member 2. At the same time, fluid pressure is supplied to the bottom of the groove 47 through the passage 52 in the main body member 2 to cause expansion of the seal 48 into fluid-tight engagement with the I.D. of the new pipe section P₂ for maintaining the location of the main body member 2 within the pipe sections during axial movement of the pull bar assembly 3 and intermediate segments 15 away from the main body member.

When the pull bar assembly 3 reaches its fully extended position illustrated in FIG. 7, fluid pressure is supplied to the other seal groove 50 through aligned passages 52, 53 in the main body member 2 and pull bar assembly 3, respectively, thereby causing the seal 49 also to expand into fluid-tight engagement with the I.D. of the pipe section P₁ (see enlargement of FIG. 8). With both seals 48, 49 expanded, there is established a pressure chamber 75 within the pipe sections P₁, P₂ for testing of the weld joint as by supplying the required test pressure to the chamber 75 through the aligned passages 60, 61, and 62 in the mandrel 1 to check for leaks. Afterwards, the seal pressure is released and the mandrel 1 is pulled to the opposite end of the newly joined pipe section P₂ for repeating the sequence of operations for joining additional pipe sections to the pipe line.

In FIG. 9 there is shown another form of mandrel 1' which is substantially identical in construction to the mandrel 1 just described and accordingly the same reference numerals followed by prime symbol (') are used to designate like parts. The mandrel 1' may be used to align and assist in welding pipe ends together much in the same manner in which the mandrel 1 is used. However, instead of pressure testing the weld, there is provided a non-destructive testing device 80 threaded onto the outer end of the pull bar assembly 3' which may utilize X-ray, ultrasonic, eddy current or other electrical or magnetic means for testing the quality of the weld. Thus, after the weld has been completed and the pull bar assembly 3' extended to contract the ring segments 14', 15', the seal 48', 49' pressure is released to permit movement of the mandrel 1' into position with the testing device 80 directly opposite the weld, after which the seals 48', 49' are again expanded to hold the mandrel 1' stationary during the testing operation.

From the above discussion, it can now be seen that the various mandrels disclosed herein are of a unique and simple construction which permits them to be readily moved in to position internally of the ends of a pair of pipe sections to be joined and expanded to provide a continuous backup ring which holds the ends of the pipe sections in perfect mating alignment during the welding operation. Afterwards, the mandrels may be used to test the quality of the weld in a simple and economical manner.

Other modes of applying the principles of the invention may be employed, change being made as regards the details described, provided the features stated in any of the following claims or the equivalent of such be employed.

We, therefore, particularly point out and distinctly claim as our invention:

1. A combination pipe welding and testing mandrel comprising a plurality of circumferentially spaced segments, means mounting said segments for radial movement into and out of engagement with the I.D. of pipe ends to be welded together, annular seal means disposed adjacent opposite ends of said segments, means for expanding said seal means into fluid-tight engagement with the I.D. of such pipe ends to support said mandrel within the pipe ends after contraction of said segments, and means for testing the welded joint subsequent to welding of the pipe ends together while said seal means are in fluid-tight engagement with such pipe ends as aforesaid.

2. The mandrel of claim 1 wherein said joint testing means comprises means for emitting fluid pressure from said mandrel intermediate said annular seal means for pressure testing of the welded joint.

3. The mandrel of claim 1 wherein said joint testing means comprises a non-destructive testing device carried by one end of said mandrel.

4. The mandrel of claim 1 wherein said means mounting said segments for radial movement comprises a main body member, a reciprocable pull bar assembly extending axially from said main body member, a stationary cam bar fixed to said main body member, a traveling cam bar mounted on the outer end of said pull bar assembly for reciprocating movement therewith, cam means on said stationary and traveling cam bars respectively connecting said segments to one or the other of said stationary and traveling cam bars for relative axial movement of said segments carried by said traveling cam bar with respect to said segments connected to said stationary cam bar during reciprocating movement of said pull bar assembly, and means for effecting radial movement of all of said segments during such reciprocating movement.

5. The mandrel of claim 4 wherein all of said segments are of the same general triangular configuration with said segments alternately extending in opposite directions, and said means for effecting radial movement of said segments comprises radial sides on said segments in mating engagement with adjacent segments which cooperate during relative axial movement of said segments to wedge said segments radially while providing a continuous annular ring.

6. The mandrel of claim 5 wherein said segments have recesses therein for receipt of their associated cam means, said recesses having a tapered wall for wedging of said segments radially toward and away from said cam means.

7. The mandrel of claim 5 further comprising means for yieldably holding said segments together, including a peripheral groove in one end of said segments and an extension on the other end, and annular spring means disposed in the aligned grooves at opposite ends of said segments, said spring means also overlying said extensions at such opposite ends of said segments.

8. The mandrel of claim 1 wherein said means mounting said segments for radial movement comprises reciprocating pull bar means which when moved in one direction causes said segments to expand and when moved in the opposite direction causes said segments to contract, and a piston-cylinder assembly for reciprocating said pull bar means in opposite directions; and said means for expanding said seal means into fluid-tight engagement with the I.D. of such pipe ends comprises a first passage means for supplying expanding fluid to one of said seal means during movement of said pull bar means in the opposite direction causing said segments to contract and a second passage means which communicates with said first passage means only after said pull bar means has reached the end of its stroke and said segments are fully contracted for supplying expanding fluid to the other seal means.

9. The mandrel of claim 4 wherein one of said seal means is carried by said main body member and the other seal means is carried by the outer end of said pull bar assembly, and said means for expanding said seal means into fluid-tight engagement with the I.D. of the pipe ends comprises a first passage means in said main body member in communication with said one seal means for expanding said one seal means during axial outward movement of said pull bar assembly to contract said segments, and a second passage means in said pull bar assembly which communicates with said first passage means for expanding said other seal means after said pull bar assembly has reached the end of its axial outward movement and said segments are fully contracted.

10. An internal mandrel for pipes and the like comprising a main body member, a reciprocable pull bar assembly extending axially from said main body member, a stationary cam bar fixed to said main body member, a traveling cam bar mounted on the outer end of said pull bar assembly for reciprocating movement therewith, a plurality of circumferentially spaced segments surrounding said pull bar assembly between the ends thereof, cam means on said stationary and traveling cam bars respectively connecting said segments to one or the other of said stationary and traveling cam bars for relative axial movement of said segments carried by said traveling cam bar with respect to said segments connected to said stationary cam bar during reciprocating movement of said pull bar assembly, means for effecting radial movement of all of said segments into and out of engagement with the I.D. of a pipe during reciprocating movement of said pull bar assembly, and support wheels carried by said main body member and the outer end of said pull bar assembly for supporting said mandrel in rolling engagement with the I.D. of such pipe when said segments are radially in.

11. The mandrel of claim 10 wherein said segments have recesses therein for receipt of their associated cam means, said recesses having a tapered wall for wedging of said segments radially toward and away from said cam means.

12. The mandrel of claim 1 wherein all of said segments are of the same general triangular configuration with said segments alternately extending in opposite directions, and said means for effecting radial movement of said segments comprises radial sides on said segments in mating engagement with adjacent segments which cooperate during relative axial movement of said segments to wedge said segments radially while providing a continuous annular ring, and means for causing such relative axial movement of said segments.

13. The mandrel of claim 12 further comprising means for yieldably holding said segments together, including a peripheral groove in one end of said segments and an extension on the other end, and annular spring means disposed in the aligned grooves at opposite ends of said segments, said spring means also overlying said extensions at such opposite ends of said segments.

14. A combination pipe welding and testing mandrel comprising a plurality of circumferentially spaced segments, means mounting selected ones of said segments for axial movement relative to the others of said segments, means for effecting radial outward and inward movement of said segments into and out of engagement with the I.D. of pipe ends to be welded together during axial movement of said selected ones of said segments toward and away from the other segments, respectively, first annular seal means axially fixed with respect to said other segments, second annular seal means axially fixed with respect to said selected ones of said segments, means for expanding said first seal means into fluid-tight engagement with the I.D. of one of such pipe ends during the initial axial outward movement of said selected ones of said segments, and additional means for expanding said second seal means into fluid-tight engagement with the I.D. of the other pipe end after said selected ones of said segments have moved fully axially outwardly.

References Cited

UNITED STATES PATENTS

| | | | |
|---|---|---|---|
| 3,193,917 | 7/1965 | Loomis | 228—56.5 |
| 3,369,725 | 2/1968 | Thomas | 228—50 |
| 3,387,761 | 6/1968 | Pickard | 228—50 |

JOHN F. CAMPBELL, Primary Examiner

R. J. CRAIG, Assistant Examiner

U.S. Cl. X.R.

73—49.1; 228—40, 56.5